July 19, 1938.                     A. NAGEL                      2,123,908
SHUTTER ACTUATING MEANS ON THE CAMERA BODY OF A FOLDING CAMERA
Filed July 22, 1937
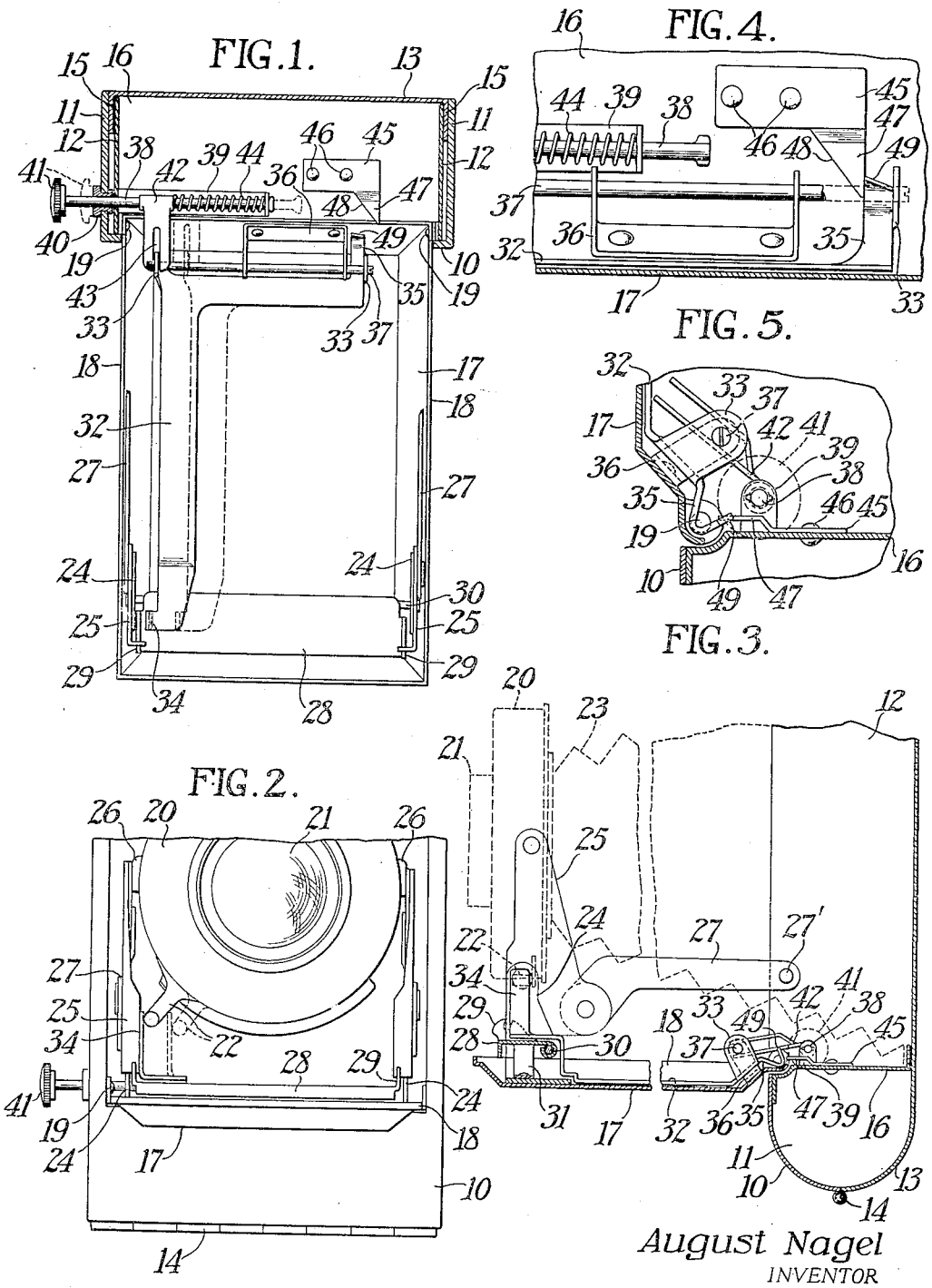
August Nagel
INVENTOR
BY Newton M. Perrins
George A. Gillette, Jr.
ATTORNEYS Patented July 19, 1938

2,123,908

UNITED STATES PATENT OFFICE 2,123,908

SHUTTER ACTUATING MEANS ON THE CAMERA BODY OF A FOLDING CAMERA

August Nagel, Stuttgart, Germany, assignor to Eastman Kodak Company, Rochester, N. Y., a corporation of New Jersey Application July 22, 1937, Serial No. 155,053
In Great Britain October 31, 1936

8 Claims. (Cl. 95—53)

The present invention relates to a shutter actuating means on the camera body of a folding camera and more particularly to a catch means in said camera body for engaging and holding said shutter actuating means in a retracted position when the camera is folded to closed position.

Shutter actuating means of the type contemplated by the present invention include a finger member normally extending from the camera body and depressed toward said camera body for operation of the shutter. Obviously when the camera is not in use and the bed thereof is moved to closed position it is desirable that such finger member should not protrude from the camera body.

The primary object of the present invention is the provision of a catch means on the camera body for engaging a shutter actuating means including a finger piece normally extending from the camera body and for holding said finger piece in retracted position only when the folding bed of the camera is in closed position and automatically releasing said shutter actuating means for normal extension of the finger member when the folding bed is open.

Another object of the invention is the arrangement of the shutter actuating means and operating arm upon the shutter so that upon closing of the camera bed said shutter actuating means and shutter operating arm are displaced or rendered inoperative with respect to each other and whereby the finger member of the actuating means may be manually retracted without operating the shutter.

Other and further objects of the invention will be suggested to those skilled in the art by the description which follows.

The above and other objects of the invention are realized in a photographic camera including a camera body, a folding bed and a shutter assembly including an operating arm in combination with a shutter actuating means comprising a member movably mounted upon the folding bed for actuation of the shutter actuating arm and including a second member movably mounted upon the camera body for movement to a retracted position, and a catch means on the camera body adapted and located to engage one of the members of said shutter actuating means to hold the member on the camera body in retracted position.

Reference is hereby made to the accompanying drawing wherein similar reference characters designate similar elements and wherein:

Fig. 1 is a plan view of a photographic camera with its folding bed in open position.

Fig. 2 is a front elevation of a folding camera with the bed open.

Fig. 3 is a side elevation of a folding camera equipped with the shutter actuating means and catch of the present invention.

Fig. 4 is a fragmentary section showing the catch means on the camera body in relation to the shutter actuating means when the finger member is being held in retracted position.

Fig. 5 is a fragmentary cross section through the joint between the camera body and folding bed and constituting an end view of the arrangement shown in Fig. 4.

The present invention is illustrated in connection with a folding camera of the hinged bed type but it is to be understood that the invention may also be applied to other types of folding cameras with collapsible or foldable fronts. The camera illustrated consists essentially in a camera body, a folding bed and a shutter assembly.

The camera body may comprise a camera housing 10 having side walls 11 and inner side walls 12 spaced therefrom and a camera back 13 connected to camera housing 10 by a hinge 14 and including side flanges 15 which enter between the side walls 11 and 12 when said camera back 13 is closed. An inner frame member 16 is mounted within camera housing 10 and may include the aforementioned inner side walls 12.

The folding bed comprises a bed plate 17 having side flanges 18 and pivotally connected by pins 19 to the inner side walls 12 of the camera housing 10. Said plate 17 is adapted in a well known manner to be moved to an open position illustrated in Figs. 1 to 3, inclusive, and to a closed position as indicated in Figs. 4 and 5.

The shutter assembly comprises a photographic shutter 20 of conventional design and including an objective 21 and a shutter operating arm 22 which may be moved to the position indicated by dotted lines in Fig. 2 for actuation of the shutter. A foldable bellows 23 is connected between the shutter 20 and the inner frame member 16 of the camera body.

The shutter assembly is mounted upon the folding bed in a known manner and may be folded into the camera body and covered by the folding bed. Such an arrangement may include uprights 24 on bed plate 17, side plates 25 pivoted at their lower ends to uprights 24 and at their upper ends to ears 26 attached to shutter 20, and side braces 27 pivoted at their forward ends to side plates 25 and at their rear ends in the camera body by pivots 27'. A locking arrangement for holding the bed and shutter assembly in open position may comprise a bar 28 carrying jaws 29 and pivotally mounted upon a rod 30 extending between uprights 24. A spring 31, see Fig. 3, urges bar 28 upwardly and jaws 29 into engagement with lugs on side plates 25. In order to collapse the folding bed it is merely necessary to depress bar 28 and to fold the bed about its hinged connections toward the camera body whereupon the shutter assembly is moved into the camera body and the folding bed encloses the same. The camera features thus far described may vary considerably without affecting the applicability of the invention which will now be described.

A shutter actuating means is provided for actuating the operating arm on the shutter and is operable from the camera body. Such a shutter actuating means includes a member movably mounted in the camera body and an inter-connecting member movably mounted on the camera bed.

An actuator member 32 includes a pair of side lugs 33, an upright portion 34 and a hooked projection 35. A bracket 36 is riveted to bed plate 17 and slidably supports a rod 37 which has its ends attached to the side lugs 33 of actuator member 32. The upright portion 34 of actuator member 32 is adjacent the shutter operating arm 22 of shutter 20 and lateral movement of actuator member 32 to the position indicated by dotted lines in Fig. 1 will move upright portion 34 and shutter operating arm 22 to the positions indicated by dotted lines in Fig. 2 for actuation of said arm 22 and operation of said shutter 20.

The shutter actuating means also includes a member which is movably mounted upon the camera body and which comprises a stem 38 slidably supported at one end by a bracket 39 on inner frame member 16 and at the other end by a bushing 40 in outer side wall 11 of the camera body. A finger piece 41 is mounted on the outer end of stem 38. A jaw member 42 is fastened to stem 38 and is provided with a slot 43 which receives one of the side lugs 33 of actuator member 32. A coil spring 44 encircles stem 38 between jaw member 42 and bracket 39, normally to urge stem 38 and finger piece 41 to the position shown by full lines in Figs. 1 and 2. Depression of finger piece 41 slides stem 38 and jaw member 42 laterally against the action of coil spring 44 and at the same time moves actuator member 32 to the position indicated by dotted lines whereupon upright portion 34 and shutter operating arm 22 are also moved to the position indicated by dotted lines in Fig. 2 and shutter 20 is operated. Upon release of finger member 41 the shutter actuating means is returned by coil spring 44 to the position shown.

In order that finger piece 41 may be retracted when the camera is not in use, a catch member is provided on the camera body for engaging the shutter actuating means when the folding bed is closed and when said shutter actuating means is moved to a retracted position. Such a catch means comprises a spring catch 45 which is fastened by rivets to frame member 16 and which includes a resilient tooth 47 having an inclined edge 48. The hooked projection 35 on actuator member 32 is also provided with an inclined edge 49. As a result, when the folding bed is moved to closed position, hooked projection 35 is rotated into the position shown in Fig. 5 and manual retraction or depression of finger piece 41 moves the inclined edge 49 on hooked projection 35 against the inclined edge 48 on spring catch 45 to raise resilient tooth 47 and permit projection 35 to pass beyond said resilient tooth 47. Whereupon the actuator member 32 is maintained against the action of coil spring 44 in the position shown in Fig. 4 with the finger piece 41 in the position indicated by dotted lines in Fig. 1. At the same time the upright portion 34 of actuator member 32 is maintained also in the position shown by dotted lines in Figs. 1 and 2 but since the folding bed is in closed position the shutter operating arm 22 is now displaced from upright portion 34 and such manual retraction of finger piece 41 does not operate the photographic shutter 20. When the folding bed is moved to open position the hooked projection 35 is dis-engaged from the resilient tooth 47 and coil spring 44 acts immediately to return the shutter actuating means including finger piece 41 to its normal position. This action takes place before upright portion 34 is adjacent shutter operating arm 22 so that upright portion 34 assumes a proper operative position with respect to arm 22.

Since the present invention may be varied in detail, the scope of the invention is to be determined by the appended claims.

Having now particularly described my invention, what I desire to secure by Letters Patent of the United States and what I claim is:

1. In a photographic camera, the combination with a camera body part, a foldable bed part connected to said camera body part, and a shutter assembly adjacent said bed part and including an operating arm, of a shutter actuating means between said camera body part and said operating arm, including a member movable with respect to said bed part to actuate said operating arm, and including a second member on said body part, connected to the first mentioned member, and movable to a retracted position, and a catch means on one of said parts located to engage one of said members of said shutter actuating means and adapted to hold the member on said camera body part in a retracted position.

2. In a photographic camera, the combination with a camera body, a foldable bed connected to said camera body and movable to closed and open positions, and a shutter assembly adjacent said bed and including a shutter operating arm, of a shutter actuating means between said camera body and said operating arm, including a member movable with respect to said bed to actuate said operating arm, and including a second member on said body connected to the first mentioned member and movable to a retracted position, said shutter means and said shutter actuating means being foldable into said camera body, and a catch means on said camera body and located to engage one of said members of said shutter actuating means only when said bed is in closed position and the member on said camera body is in retracted position.

3. In a photographic camera, the combination with a camera body part, a foldable bed part connected to said camera body part and movable to closed and open positions, and a shutter assembly adjacent said bed part and including a shutter operating arm, of a shutter actuating means between said camera body part and said operating arm, including a member movable with respect to said bed part to actuate said operating arm, including a second member on said body part connected to the first mentioned member and movable from an extended position to a retracted position, and including a spring connected to one of said members for normally maintaining said second member in said extended position, said shutter means and said shutter actuating means being foldable into said camera body part, and a spring catch on one of said parts and located to engage one of said members of the shutter actuating means only when said bed part is in closed position and the member on said camera body part is in retracted position.

4. In a photographic camera, the combination with a camera body, a foldable bed connected to said camera body and movable to closed and open positions, and a shutter assembly adjacent said bed and including a shutter operating arm, of a shutter actuating means between said camera body and said operating arm, including a member movable with respect to said bed to actuate said operating arm, and including a second member on said body connected to the first mentioned member and movable to a retracted position, said shutter means and said shutter actuating means being foldable into said camera body, and a catch means on said camera body, located to engage one of said members of the shutter actuating means when said bed is in closed position and dis-engaging said member when said bed is moved to open position.

5. In a photographic camera, the combination with a camera body, a foldable bed connected to said camera body and movable to closed and open positions, and a shutter assembly adjacent said bed and including a shutter operating arm, of a shutter actuating means between said camera body and said operating arm, including a member movable with respect to said bed to actuate said operating arm, including a second member on said body connected to the first mentioned member and movable from an extended position to a retracted position, and including a spring connected to one of said members for normally maintaining said second member in said extended position, said shutter means and said shutter actuating means being foldable into said camera body, and a spring catch on said camera body, located to engage one of said members of the shutter actuating means when said bed is in closed position and dis-engaging said member when said bed is moved to open position.

6. In a photographic camera, the combination with a camera body, a foldable bed connected to said camera body and movable to closed and open positions, and a shutter assembly operatively connected to said bed and including a shutter operating arm, of a shutter actuating means between said camera body and said operating arm, including a member movable with respect to said bed to engage and actuate said operating arm and including a second member on said camera body connected to the first mentioned member and movable to a retracted position, said shutter means and said shutter actuating means being foldable into said camera body and said first mentioned member being displaced from and unable to engage said shutter operating arm, and a catch means on said camera body and located to engage one of said members of said actuating means when said bed is in closed position with the first mentioned member displaced from said operating arm and when said member on the camera body is in retracted position.

7. In a photographic camera, the combination with a camera body provided with a chamber, a bed hinged to said camera body and for covering said chamber, and a shutter assembly linked to said bed and including a shutter operating arm, of an actuating member slidably mounted on said bed and for engaging said shutter operating arm to actuate the same when said bed is in open position but displaced from said arm when the bed is closed, a control member slidably mounted in said camera body, operatively connected to said actuating member, and having a finger piece normally extending from said camera body, a projection on said actuating member, and a spring catch on said camera body and for engaging said projection when said bed is closed and the control member is moved to a retracted position which movement is inoperative to actuate said shutter operating arm.

8. In a photographic camera, the combination with a camera body provided with a chamber, a bed hinged to said camera body and for covering said chamber, and a shutter assembly linked to said bed and including a shutter operating arm, of an actuating member slidably mounted on said bed and for engaging said shutter operating arm to actuate the same when said bed is in open position but displaced from said arm when the bed is closed, a control member slidably mounted in said camera body, operatively connected to said actuating member, and having a finger piece normally extending from said camera body, a projection on said actuating member, and a spring catch on said camera body, for engaging said projection to hold said actuating member and finger piece in retracted position, and relatively located to be disengaged when said bed is moved to open position.

AUGUST NAGEL.